US009466299B1

(12) United States Patent
Feltham et al.

(10) Patent No.: US 9,466,299 B1
(45) Date of Patent: Oct. 11, 2016

(54) SPEECH SOURCE CLASSIFICATION

(71) Applicant: International Business Machines Corporation, Armonk, NY (US)

(72) Inventors: Andrew S. Feltham, Hampshire (GB); Robert S. Smart, Hampshire (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/944,590

(22) Filed: Nov. 18, 2015

(51) Int. Cl.
*G10L 17/26* (2013.01)
*G10L 17/14* (2013.01)
*G10L 17/20* (2013.01)

(52) U.S. Cl.
CPC ............... *G10L 17/26* (2013.01); *G10L 17/14* (2013.01); *G10L 17/20* (2013.01)

(58) Field of Classification Search
CPC ....... G10L 17/00; G10L 17/02; G10L 17/06; G10L 17/08; G10L 17/12; G10L 17/14; G10L 17/20; G10L 17/26
USPC ............................... 704/230, 246, 249, 250
See application file for complete search history.

(56) References Cited

U.S. PATENT DOCUMENTS

| 8,489,399 | B2 | 7/2013 | Gross | |
|---|---|---|---|---|
| 8,494,854 | B2 | 7/2013 | Gross | |
| 2009/0259468 | A1 | 10/2009 | Schroeter | |
| 2009/0319270 | A1* | 12/2009 | Gross | G10L 17/26 704/246 |
| 2009/0319274 | A1* | 12/2009 | Gross | G10L 17/26 704/260 |
| 2013/0218566 | A1 | 8/2013 | Qian et al. | |
| 2013/0339245 | A1* | 12/2013 | Epstein | G06Q 20/40145 705/44 |
| 2015/0066512 | A1* | 3/2015 | Kons | G10L 25/51 704/273 |

OTHER PUBLICATIONS

Speaker recognition, From Wikipedia, Retrieved from Internet on Nov. 3, 2015, https://en.wikipedia.org/wiki/Speaker_recognition, 3 pages.
Can Twilio tell whether a call was answered by a human or machine? Aug. 31, 2015, https://www.twilio.com/help/faq/voice/can-twilio-tell-whether-a-call-was-answered-by-a-human-or-machine, 4 pages.

\* cited by examiner

*Primary Examiner* — Qi Han
(74) *Attorney, Agent, or Firm* — Schmeiser, Olsen & Watts, LLP; Mark C. Vallone

(57) ABSTRACT

A method and associated system and computer program product. A sample of speech, for which a source of the sample of speech is to be classified, is received. A frequency clip level of the sample of speech is determined. A higher frequency clip level indicates the source is human and a lower frequency clip level indicates the source is machine generated. A dynamic range of the sample of speech is determined. A lower dynamic range indicates the source is human and a higher dynamic range indicates the source is machine generated. The frequency clip level and the dynamic range are weighted by a respective weighting factor as to whether the source is human or the source is machine generated. The source is classified as human generated or machine generated. The classifying of the source is based on the frequency clip level, the dynamic range, and the respective weighting factors thereof.

18 Claims, 7 Drawing Sheets

SPEECH SOURCE CLASSIFICATION

TECHNICAL FIELD

The present invention relates to speech source classification, and more specifically to classifying a sample of speech as originating from a human source or being generated by a machine.

BACKGROUND

Algorithms in the field of speaker recognition are concerned with achieving either the verification of a user or the identification of a user.

Verification of a user is achieved by matching a first canonical voice sample held in storage with a second provided voice sample. If the two samples are deemed to be a close match, then the close match suggests that the verification has succeeded. However, if the two samples are not a close match, then the lack of a close match suggests that the verification has failed. For verification of a user, a first stored sample is required and a second "live" sample must be given, at the time of verification, that closely replicates the content of the stored sample; that is, by the same words and/or sentence in the second "live" sample being recited in a similar manner to the first canonical voice sample which has been stored.

Identification of a user is achieved by matching one voice sample of a large number of voice samples held in storage with a single given voice sample. If (or when) a match is found between the single given voice sample and one of the large number of voice samples, then it can then be determined from that match the identity of the user that provided the sample to be matched against.

SUMMARY

A method and associated system and computer program product. One or more processors of the computer system receive a sample of speech for which a source of the sample of speech is to be classified. The one or more processors determine a frequency clip level of the sample of speech, a higher frequency clip level indicating the source is human and a lower frequency clip level indicating the source is machine generated. The one or more processors determine a dynamic range of the sample of speech, a lower dynamic range indicating the source is human and a higher dynamic range indicating said source is machine generated. The one or more processors weight the frequency clip level and the dynamic range as to whether the source is human or the source is machine generated by a respective weighting factor. The one or more processors classify the source as human generated or machine generated. The classifying is based on the frequency clip level, the dynamic range, and the respective weighting factors thereof.

BRIEF DESCRIPTION OF THE DRAWINGS

Embodiments of the present invention will now be described in more detail, by way of example only, with reference to the accompanying drawings.

DETAILED DESCRIPTION

Figure 1:
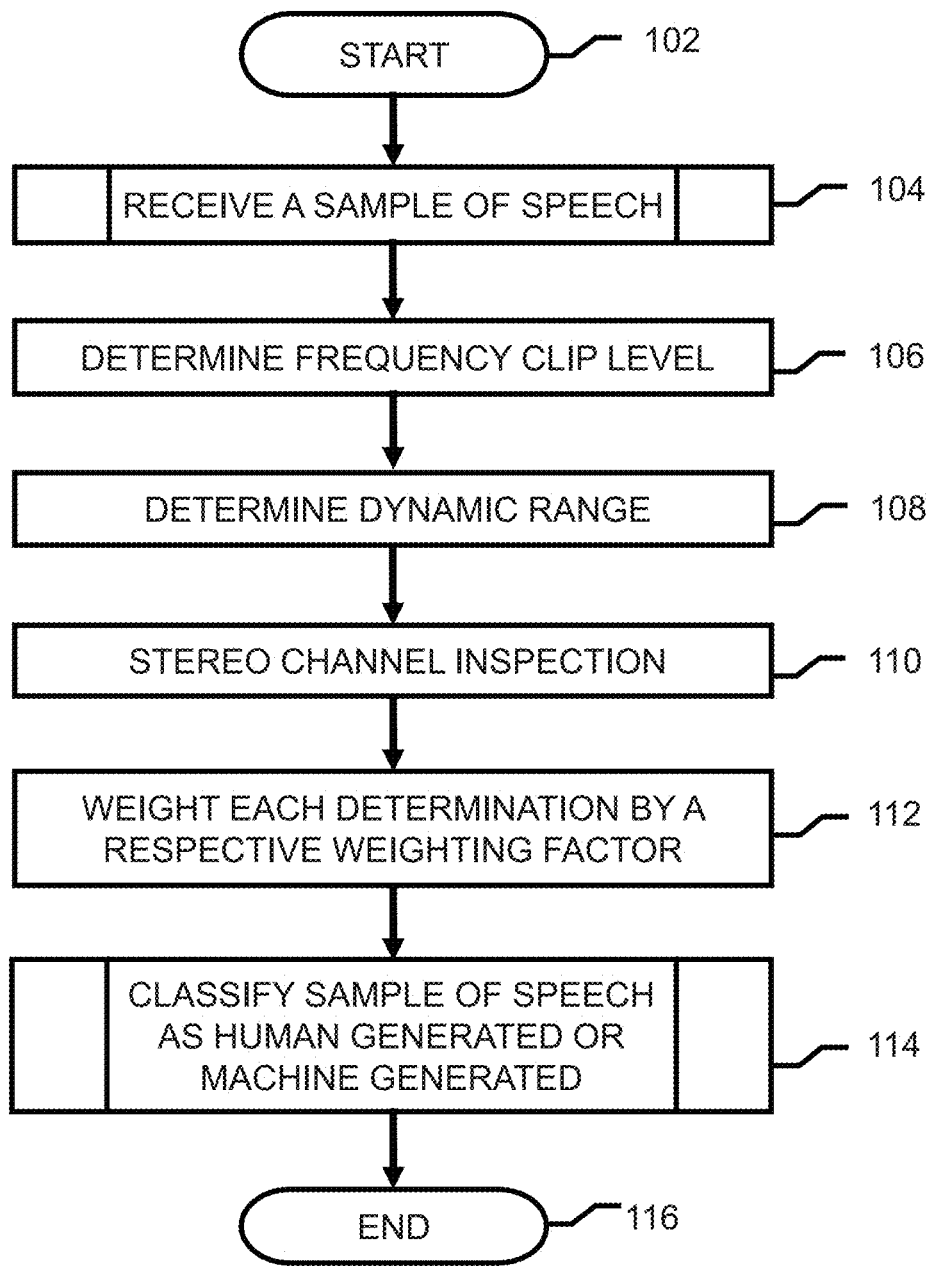
FIG. 1 shows a flow diagram of an embodiment of a method of classifying the source of a sample of speech, in accordance with embodiments of the present invention.

FIG. 1 shows a flow diagram of an embodiment of a method of classifying the source of a sample of speech, in accordance with embodiments of the present invention. Step 102 starts the classifying of the source of a sample of speech. In an embodiment, the classification is between the source of the sample of speech being a human or being machine generated. At step 104, a sample of speech for which the source is to be classified is received. In an embodiment, the sample of speech is a recorded sample, which may be in any format used for the recording of speech, such as, for example, WAV, FLAC, MP3, Vorbis, AAC or WMA or any other format. In another embodiment, the sample of speech is a streamed sample, which may also be in any format used for the streaming of speech, such as, for example, WAV, FLAC, MP3, Vorbis, AAC or WMA or any other format.

Figure 5:
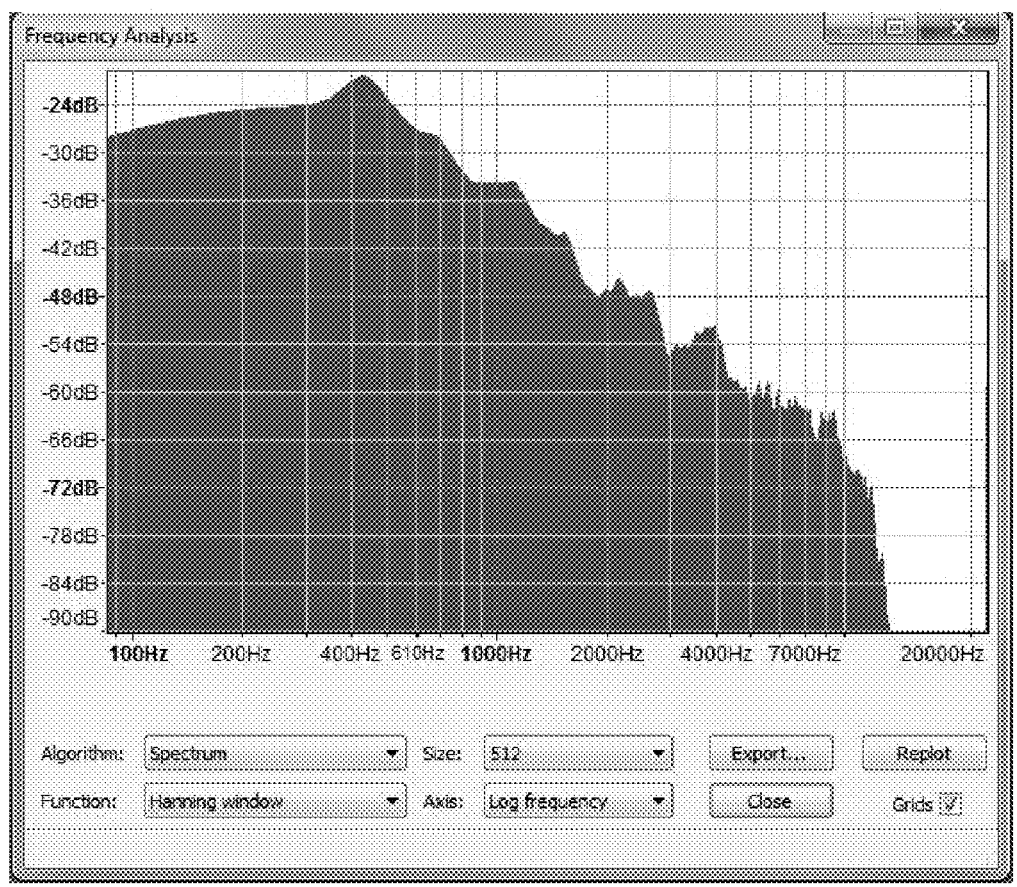
FIG. 5 shows a screen shot of a spectrum plot corresponding to the sample of machine generated speech of FIG. 4, in accordance with embodiments of the present invention.

At step 106, the frequency clip level of the sample of speech is determined, a higher frequency clip level indicating that the source of the sample of speech is human and a lower frequency clip level indicating that the source of the sample of speech is machine generated. Frequency clip level is defined herein as a minimum frequency above which essentially no sound is created. In one embodiment as discussed infra, FIGS. 3 and 5 depict a frequency clip level of about 20 kHz for human speech and about 12 kHz for machine generated speech, respectively.

Figure 2:
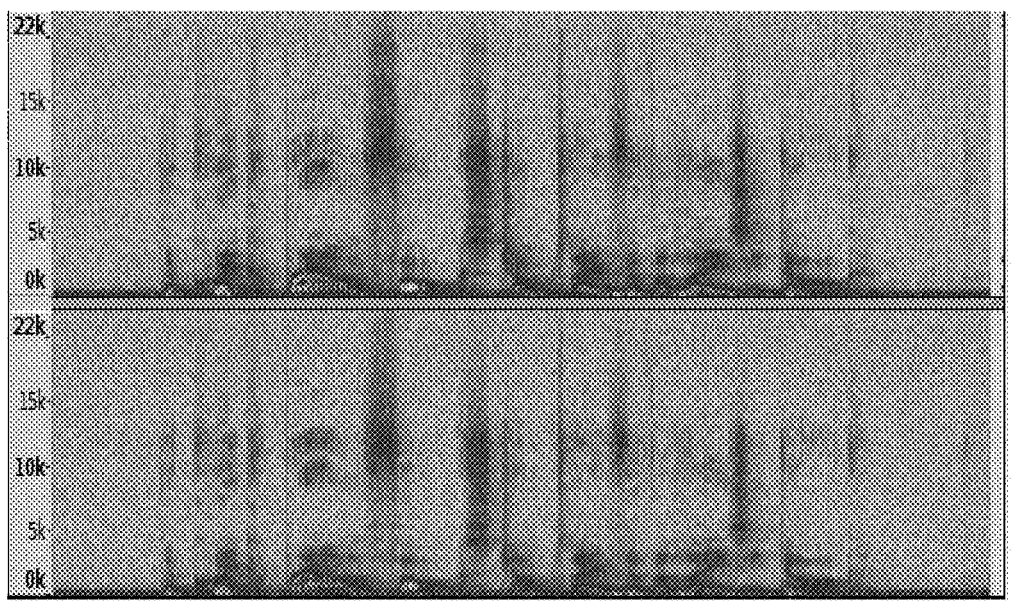
FIG. 2 shows a screen shot of a spectrogram of a sample of human speech, in accordance with embodiments of the present invention.

FIG. 2 shows a screen shot of a spectrogram of a sample of human speech, in accordance with embodiments of the present invention. In FIG. 2, the spoken text of the human speech is "the quick brown fox jumped over the lazy dog". The horizontal axis represents time. The vertical axis represents frequency. The intensity (or darkness) of each point on the plot represents the amplitude of a particular frequency (corresponding to frequency position in a vertical direction) at a particular time (corresponding to time position in a horizontal direction). The upper and lower portions of FIG. 2 represent the two channels of a stereo signal. It can be seen that the spectrogram of the sample of human speech extends to about 20 kHz or so.

Figure 3:
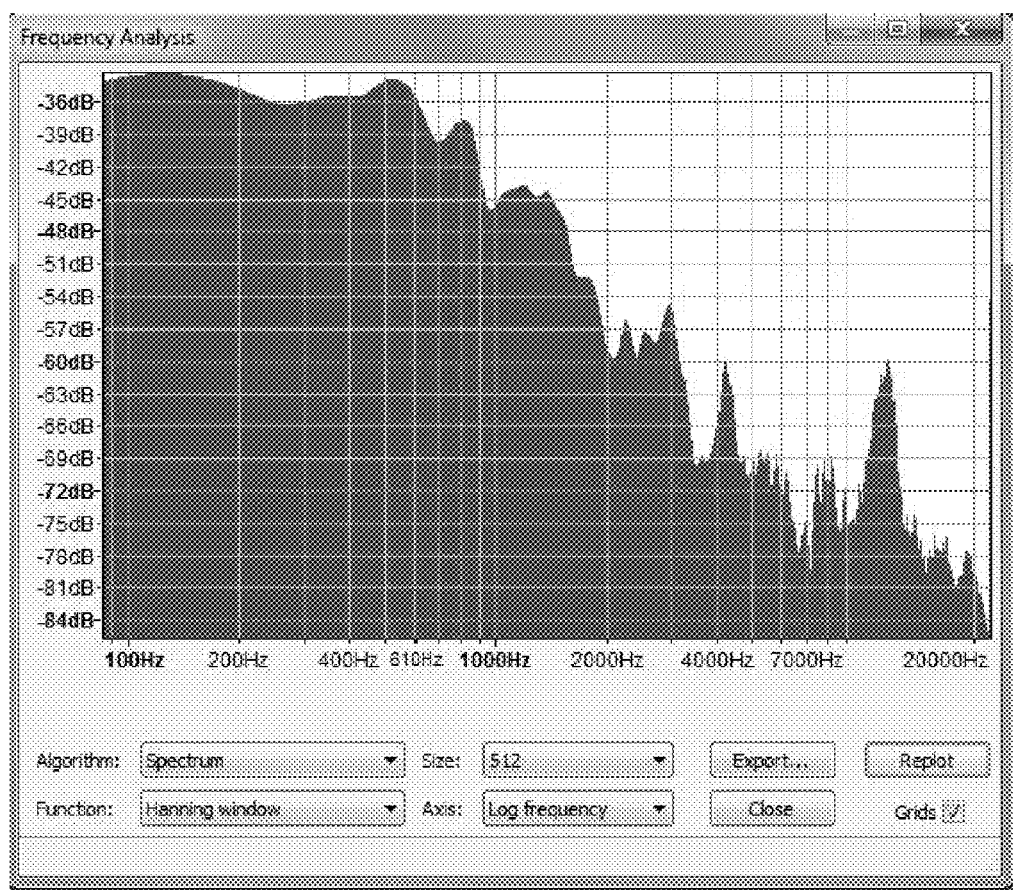
FIG. 3 shows a screen shot of a spectrum plot corresponding to the sample of human speech of FIG. 2, in accordance with embodiments of the present invention.

FIG. 3 shows a screen shot of a spectrum plot corresponding to the sample of human speech of the spectrogram of FIG. 2, in accordance with embodiments of the present invention. The vertical axis represents the amplitude of the sample, and the horizontal axis represents frequency. FIG. 3 also shows that the frequency spectrum extends to around 20 kHz or so, with substantial components above 12 kHz.

Figure 4:
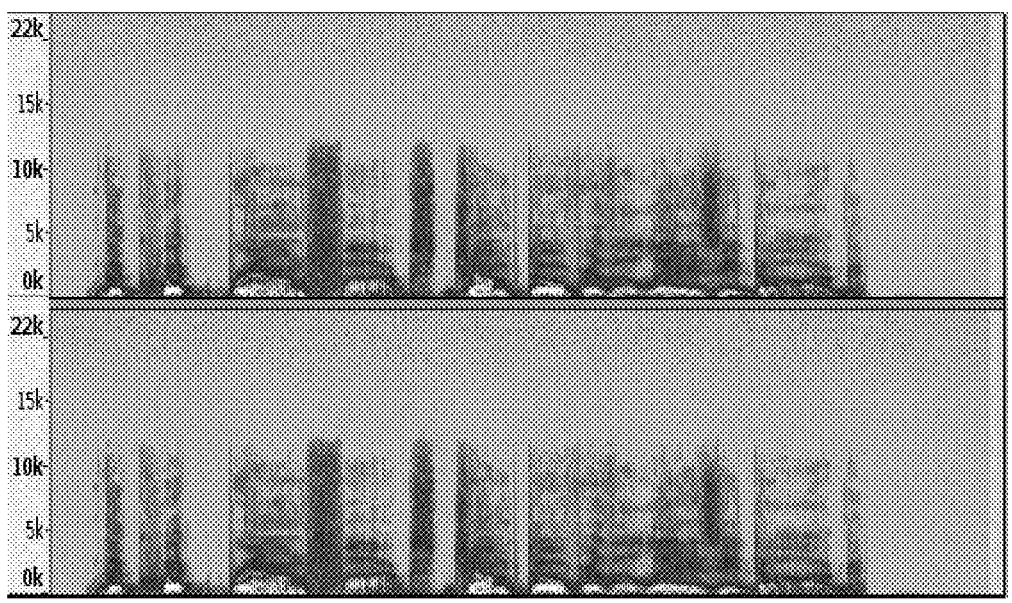
FIG. 4 shows a screen shot of a spectrogram of a sample of machine generated speech, in accordance with embodiments of the present invention.

FIG. 4 shows a screen shot of a spectrogram of a sample of machine generated speech, in accordance with embodiments of the present invention. In FIG. 4, the spoken text by the machine is "the quick brown fox jumped over the lazy dog". The horizontal axis represents time. The vertical axis represents frequency. The intensity (or darkness) of each point on the plot represents the amplitude of a particular frequency (corresponding to frequency position in a vertical direction) at a particular time (corresponding to time position in a horizontal direction). The upper and lower portions of FIG. 4 represent the two channels of a stereo signal. It can be seen that the spectrogram of the sample of human speech extends only to about 12 kHz or so.

FIG. 5 shows a screen shot of a spectrum plot corresponding to the sample of machine generated speech of FIG. 4. The vertical axis represents the amplitude of the sample, and the horizontal axis represents frequency. This also shows that the frequency spectrum extends only to around 12 kHz or so, with no substantial components above 12 kHz. Machine generated speech, such as that generated by text-to-speech converters, has a well-defined frequency clip level on the frequency spectrum. There is a frequency above which little to no sound is created, and this is a reliable form of identification of machine generated speech. A high weight may be applied to this metric (frequency clip level) when combining more than one metric.

Returning to FIG. 1, at step 108, the dynamic range of the sample of speech is determined, a lower dynamic range indicating the source of speech is human, and a higher dynamic range indicating the source of speech is machine generated.

Figure 6:
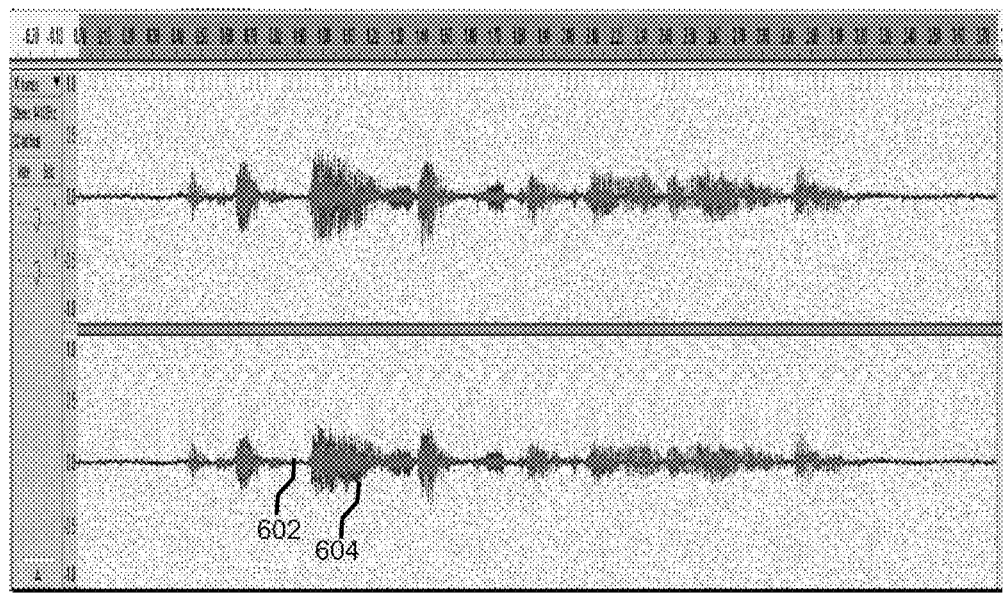
FIG. 6 shows a screen shot of a waveform of the sample of human speech of FIG. 2, in accordance with embodiments of the present invention.

FIG. 6 shows a screen shot of a waveform of the sample of human speech of FIG. 2, in accordance with embodiments of the present invention. The horizontal axis represents time. The vertical axis represents amplitude. Unlike FIG. 2, which shows the frequency distribution of the sample, FIG. 6 shows the actual waveform of the sample. The upper and lower portions of FIG. 6 represent the two channels of a stereo signal. Firstly, it can be seen that the waveform of FIG. 6 has a small dynamic range, with the standard deviation of the amplitude being low. Secondly, there are no time slots where there is near to, or complete, silence. The gaps 602 between the spoken words (the larger amplitude portions 604) can be interpreted as periods of low level noise. This low level noise may be background noise from the environment in which the sample was recorded, noise caused by processing the signal, or both.

Figure 7:
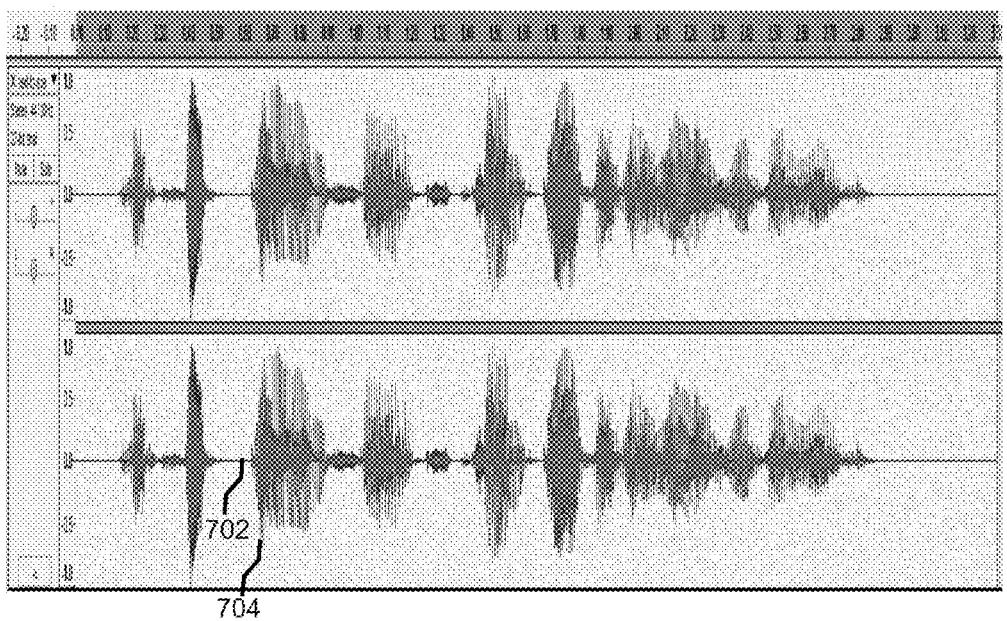
FIG. 7 shows a screen shot of a waveform of the sample of machine generated speech of FIG. 4, in accordance with embodiments of the present invention.

FIG. 7 shows a screen shot of a waveform of the sample of machine generated speech of FIG. 4, in accordance with embodiments of the present invention. The horizontal axis represents time. The vertical axis represents amplitude. Unlike FIG. 4, which shows the frequency distribution of the sample, FIG. 7 shows the actual waveform of the sample. The upper and lower portions of FIG. 7 represent the two channels of a stereo signal. Firstly, it can be seen that the waveform of FIG. 7 has a larger dynamic range than the waveform of FIG. 6, with the standard deviation of the amplitude in FIG. 7 being higher than the standard deviation of the amplitude in FIG. 6. Secondly, there are a number of time slots where there is complete silence in FIG. 7. The gaps 702 between the spoken words (the larger amplitude portions 704) can be interpreted as periods of complete silence. These periods of silence are typically regularly spaced.

The small periods of silence throughout the waveform of FIG. 7 may be detected and/or averaged. This metric of step 108 is less reliable than the determining the frequency clip level of step 106, so a medium weight may be applied when combining the metrics.

Returning to FIG. 1, if the sample of speech received at step 104 is a stereo sample of speech having at least two channels, then optionally, at step 110, a determination is made as to whether there is a difference between each of the at least two channels. Such a determination may be made using any one or more of the spectrograms of FIGS. 2 and 4, the spectrum plots of FIGS. 3 and 5, or the waveforms of FIGS. 6 and 7. If the sample of speech received at step 104 is not a stereo sample of speech having at least two channels, then step 110 is omitted. Step 110 may also be omitted if it is determined that the determinations of step 106 and 108 are sufficient to reduce the complexity of processing the samples of speech.

A sample from a human speaker will typically have small differences between each of the stereo channels. A sample from machine generated speech, such as from a text-to-speech speaker, has identical stereo channels. The two stereo channels can be compared, and if the two stereo channels are identical, it is likely that the received sample originated from machine generated source. This metric of stereo channel difference will only work on stereo samples, and there are some occasions where this metric may provide a false-positive, such as, for example, when a text-to-speech speaker is recorded via analogusing stereo microphones. Hence, this metric is may be given a low weight when combined with other metrics.

At step 112, each of the indications as to whether the source of speech is human or the source of speech is machine generated is weighted by a respective weighting factor associated with each determination. The determination of step 106 is typically more reliable than that of the determinations of step 108 and optional step 110. The determination of step 108 is typically more reliable than that of the determination of the optional step 110. Weighting factors applied to each of the determinations may be based on the reliability, confidence or accuracy of each of the determinations.

At step 114, the source of the speech is classified as human generated or machine generated.

The classifying of the source of the sample of speech proceeds to step 116 and ends.

Figure 8:
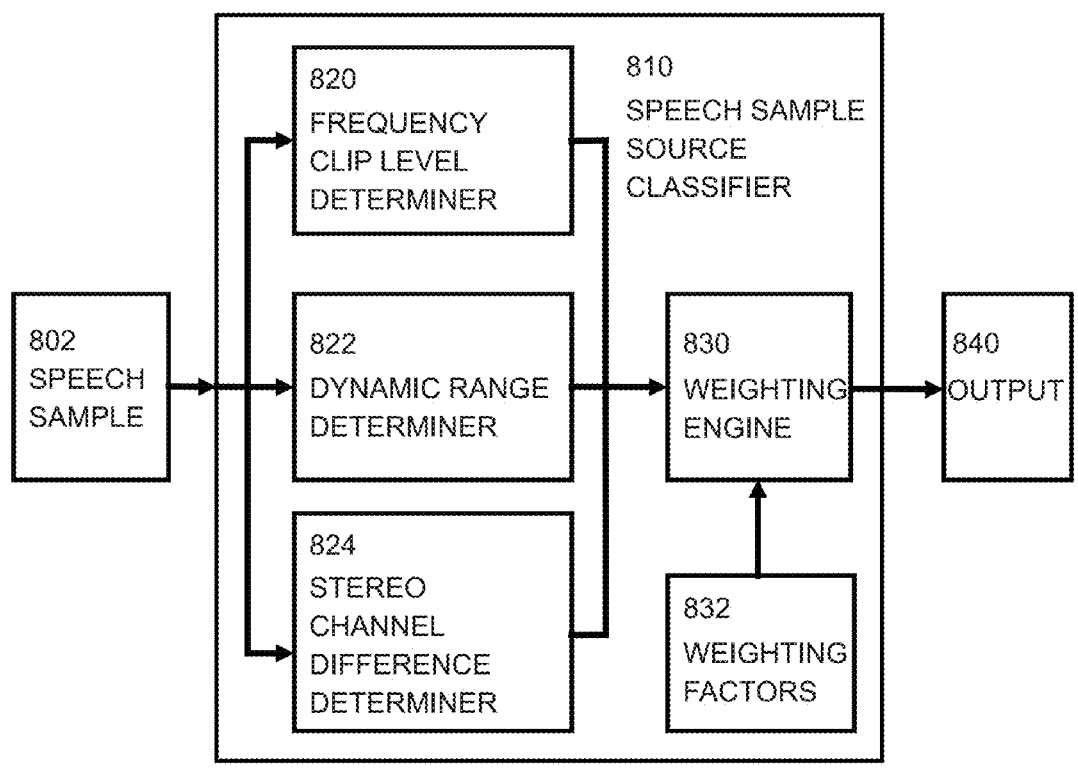
FIG. 8 shows a block diagram of an embodiment of a system of classifying the source of a sample speech, in accordance with embodiments of the present invention.

FIG. 8 shows a block diagram of an embodiment of a system 810 of classifying the source of a sample of speech 802, in accordance with embodiments of the present invention. In one embodiment, the classification is between the source of the sample of speech 802 being a human or being machine generated. In an embodiment, the sample of speech 802 is a recorded sample, which may be in any format used for the recording of speech, such as, for example, WAV, FLAC, MP3, Vorbis, AAC or WMA or any other format. In another embodiment, the sample of speech 802 is a streamed sample, which may also be in any format used for the streaming of speech, such as, for example, WAV, FLAC, MP3, Vorbis, AAC or WMA or any other format.

Speech sample source classifier 810 receives a sample of speech 802 for which the source is to be classified.

Frequency clip level determiner 820 determines the frequency clip level of the sample of speech 802, a higher frequency clip level indicating said source of speech is human, and a lower frequency clip level indicating said source of speech is machine generated. Operation of the frequency clip level determiner 820 has been described above with reference to FIGS. 2 to 5.

Dynamic range determiner 822 determines the dynamic range of the sample of speech 802, a lower dynamic range indicating the source of speech is human, and a higher dynamic range indicating the source of speech is machine generated. Operation of the dynamic range determiner 822 has been described above with reference to FIGS. 6 and 7.

Optionally, stereo channel difference determiner 824 determines whether there is a difference between each of the at least two channels of a received stereo sample of speech 802. If the sample of speech 802 received at step 104 is not a stereo sample of speech 802 having at least two channels, then step 110 is omitted. Step 110 may also be omitted if it is determined that the determinations of the frequency clip level determiner 820 and of the dynamic range determiner 824 are sufficient to reduce the complexity of processing the samples.

Weighting engine 830 applies a weighting factor 832 to each of the indications as to whether the source of speech is human or the source of speech is machine generated. The frequency clip level determiner 820 is typically more reliable than the dynamic range determiner 822 and the optional stereo channel difference determiner 824. The dynamic range determiner 822 is typically more reliable than the optional stereo channel difference determiner 824. Weighting factors 832 applied to each of the determinations may be based on the reliability, confidence or accuracy of each of the determinations.

Output 840 comprises a classification of whether the source of the speech sample 802 is classified as human generated or machine generated.

Figure 9:
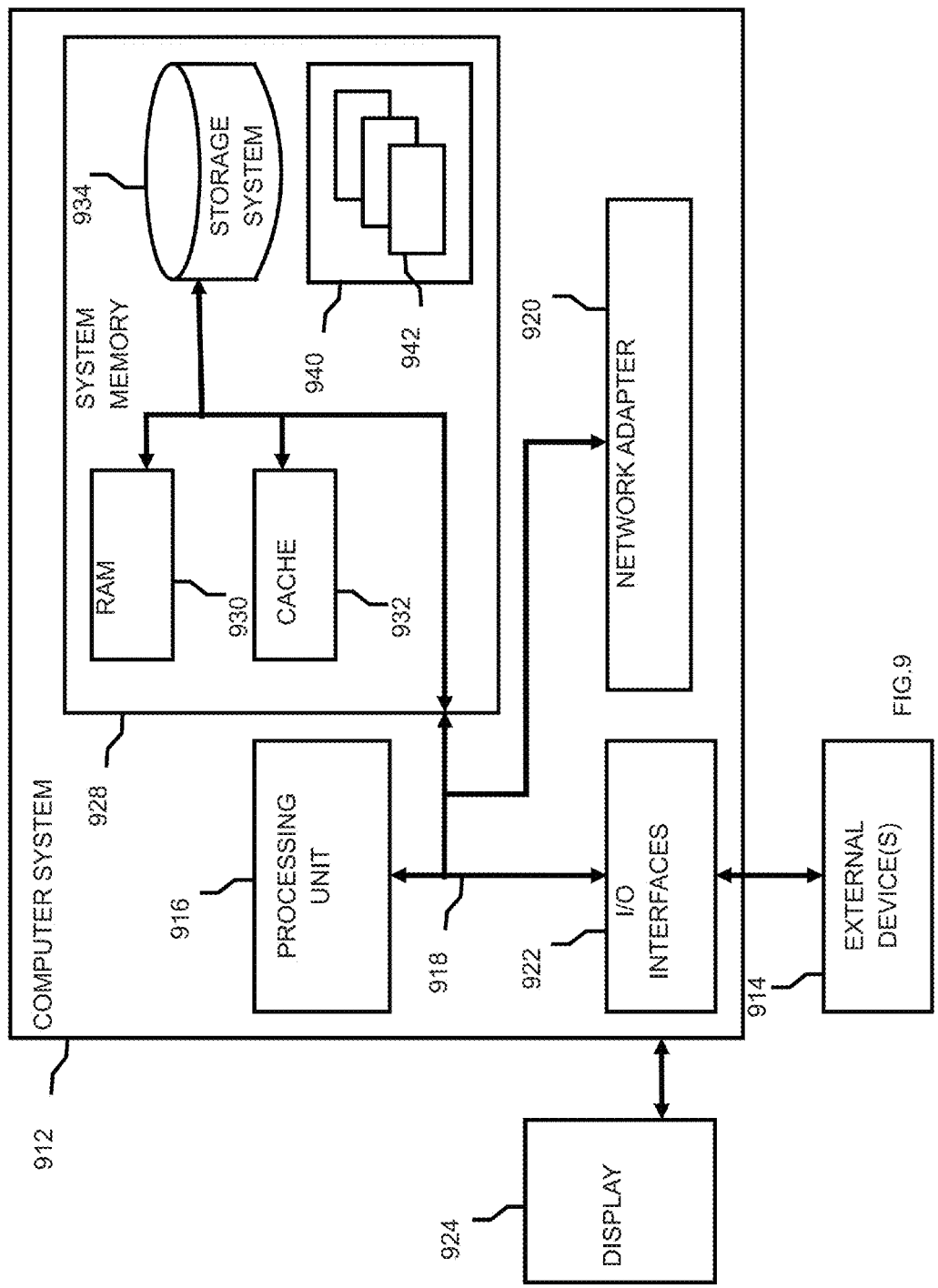
FIG. 9 shows a block diagram of a computer system/server in which embodiments of the present invention may be implemented.

FIG. 9 shows a block diagram of a computer system/server 912 in which embodiments of the present invention may be implemented. Computer system 912 is only one example of a suitable computer system and is not intended to suggest any limitation as to the scope of use or functionality of embodiments of the invention described herein. Regardless, computer system 912 is capable of being implemented and/or performing any of the functionality set forth hereinabove.

Computer system/server 912 is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
   receiving, by one or more processors of a computer system, a sample of speech for which a source of the sample of speech is to be classified, said sample of speech being an electronic audio signal in a digital format;
   determining, by the one or more processors from analysis of the electronic signal in the digital format, a frequency clip level of the sample of speech, a higher frequency clip level indicating the source is human, and a lower frequency clip level indicating the source is machine generated;
   determining, by the one or more processors from analysis of the electronic signal in the digital format, a dynamic range of the sample of speech, a lower dynamic range indicating the source is human, and a higher dynamic range indicating the source is machine generated;
   weighting, by the one or more processors, the frequency clip level and the dynamic range by a respective weighting factor as to whether the source is human or the source is machine generated; and
   classifying, by the one or more processors, the source as human generated or machine generated, said classifying based on the frequency clip level, the dynamic range, and the respective weighting factors thereof.

2. The method of claim 1, wherein the sample of speech is a stereo sample of speech having at least two channels, and wherein the method further comprises determining whether there is a difference between each of the at least two channels, said difference indicating that the source is human and no difference indicating that the source is machine generated.

3. The method of claim 1, wherein the determining the dynamic range of the sample of speech comprises determining the standard deviation of the distribution of intensities of the waveform of the sample of speech, determining the number and duration of periods of silence in the waveform of the sample of speech, or a combination thereof.

4. The method of claim 1, wherein the sample of speech is a recorded sample.

5. The method of claim 1, wherein the sample of speech is a streamed sample.

6. The method of claim 1, wherein the computer system comprises an apparatus, wherein the apparatus comprises the one or more processors and a read-only memory (ROM) hard-wired into the apparatus, wherein the ROM contains program code which upon being executed by the one or more processors implements the method, and wherein the apparatus is a special purpose machine specific to the method due to the ROM being hard wired into the apparatus.

7. A computer program product, comprising one or more computer readable hardware storage devices having computer readable program code stored therein, said program code containing instructions executable by one or more processors of a computer system implement a method, said method comprising:
   receiving, by the one or more processors, a sample of speech for which a source of the sample of speech is to be classified, said sample of speech being an electronic audio signal in a digital format;
   determining, by the one or more processors from analysis of the electronic signal in the digital format, a frequency clip level of the sample of speech, a higher frequency clip level indicating the source is human and a lower frequency clip level indicating the source is machine generated;
   determining, by the one or more processors from analysis of the electronic signal in the digital format, a dynamic range of the sample of speech, a lower dynamic range indicating the source is human and a higher dynamic range indicating the source is machine generated;
   weighting, by the one or more processors, the frequency clip level and the dynamic range by a respective weighting factor as to whether the source is human or the source is machine generated; and
   classifying, by the one or more processors, the source as human generated or machine generated, said classifying based on the frequency clip level, the dynamic range, and the respective weighting factors thereof.

8. The computer program product of claim 7, wherein the sample of speech is a stereo sample of speech having at least two channels, and wherein the method further comprises determining whether there is a difference between each of the at least two channels, said difference indicating that the source is human and no difference indicating that the source is machine generated.

9. The computer program product of claim 7, wherein the determining the dynamic range of the sample of speech comprises determining the standard deviation of the distribution of intensities of the waveform of the sample of speech, determining the number and duration of periods of silence in the waveform of the sample of speech, or a combination thereof.

10. The computer program product of claim 7, wherein the sample of speech is a recorded sample.

11. The computer program product of claim 7, wherein the sample of speech is a streamed sample.

12. The computer program product of claim 7, wherein the computer system comprises an apparatus, wherein the apparatus comprises the one or more processors and the one or more computer readable hardware storage devices, wherein the one or more computer readable hardware storage devices comprise a read-only memory (ROM) hard-wired into the apparatus, wherein the ROM contains the program code, and wherein the apparatus is a special purpose machine specific to the method due to the ROM being hard wired into the apparatus.

13. A computer system, comprising one or more processors, one or more memories, and one or more computer readable hardware storage devices, said one or more hardware storage device containing program code executable by the one or more processors via the one or more memories to implement a method, said method comprising:
- receiving, by the one or more processors, a sample of speech for which a source of the sample of speech is to be classified, said sample of speech being an electronic audio signal in a digital format;
- determining, by the one or more processors from analysis of the electronic signal in the digital format, a frequency clip level of the sample of speech, a higher frequency clip level indicating the source is human and a lower frequency indicating the source is machine generated;
- determining, by the one or more processors from analysis of the electronic signal in the digital format, a dynamic range of the sample of speech, a lower dynamic range indicating the source is human and a higher dynamic range indicating the source is machine generated;
- weighting, by the one or more processors, the frequency clip level and the dynamic range by a respective weighting factor as to whether the source is human or the source is machine generated; and
- classifying, by the one or more processors, the source as human generated or machine generated, said classifying based on the frequency clip level, the dynamic range, and the respective weighting factors thereof.

14. The computer system of claim 13, wherein the sample of speech is a stereo sample of speech having at least two channels, and wherein the method further comprises determining whether there is a difference between each of the at least two channels, said difference indicating that the source is human and no difference indicating that the source is machine generated.

15. The computer system of claim 13, wherein the determining the dynamic range of the sample of speech comprises determining the standard deviation of the distribution of intensities of the waveform of the sample of speech, determining the number and duration of periods of silence in the waveform of the sample of speech, or a combination thereof.

16. The computer system of claim 13, wherein the sample of speech is a recorded sample.

17. The computer system of claim 13, wherein the sample of speech is a streamed sample.

18. The computer system of claim 13, wherein the computer system comprises an apparatus, wherein the apparatus comprises the one or more processors and the one or more memories, wherein the one or more memories comprise a read-only memory (ROM) hard-wired into the apparatus, wherein the ROM contains the program code, and wherein the apparatus is a special purpose machine specific to the method due to the ROM being hard wired into the apparatus.

* * * * *